(12) United States Patent
Gueble

(10) Patent No.: US 11,408,968 B2
(45) Date of Patent: Aug. 9, 2022

(54) DEVICE FOR IDENTIFYING A POSITION OF AN ELECTRONIC UNIT ON A MOTOR VEHICLE

(71) Applicant: VALEO COMFORT AND DRIVING ASSISTANCE, Créteil (FR)

(72) Inventor: Christophe Gueble, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 380 days.

(21) Appl. No.: 16/605,434

(22) PCT Filed: Apr. 23, 2018

(86) PCT No.: PCT/EP2018/060320
§ 371 (c)(1),
(2) Date: Oct. 15, 2019

(87) PCT Pub. No.: WO2018/193133
PCT Pub. Date: Oct. 25, 2018

(65) Prior Publication Data
US 2020/0124697 A1 Apr. 23, 2020

(30) Foreign Application Priority Data
Apr. 21, 2017 (FR) ...................... 1753508

(51) Int. Cl.
*G01S 5/02* (2010.01)
*G01S 5/14* (2006.01)

(52) U.S. Cl.
CPC ............... *G01S 5/0289* (2013.01); *G01S 5/14* (2013.01)

(58) Field of Classification Search
CPC .................................. G01S 5/289; G01S 5/14
(Continued)

(56) References Cited

U.S. PATENT DOCUMENTS 7,181,529 B2 * 2/2007 Bhatia .................... H04L 67/18
709/219
8,344,943 B2 * 1/2013 Brown ...................... G01S 7/03
342/147
(Continued)

FOREIGN PATENT DOCUMENTS

DE 102014217504 A1 3/2016
EP 2800068 A2 11/2014
(Continued)

OTHER PUBLICATIONS

International Search Report and Written Opinion corresponding to International Application No. PCT/EP2018/060320, dated Jun. 27, 2018 (12 pages).

*Primary Examiner* — Bo Fan
(74) *Attorney, Agent, or Firm* — Osha Bergman Watanabe & Burton LLP

(57) ABSTRACT

The present invention relates to a device (DISP) for identifying a position (PosB) of a secondary electronic unit (BA) on a motor vehicle (V), comprising: —a central electronic unit (PE) suitable for managing the power supply to a plurality of secondary electronic units (BA) and having: —a switching device (DC) for switching the power supply to all the secondary electronic units (BA); —a main timer (CPTA) suitable for being triggered in a time-correlated manner with the activation of the power supply to said secondary electronic units (BA) by said switching device (DC); —and said plurality of secondary electronic units (BA); wherein each of said secondary electronic units (BA) comprises a secondary timer (CPTB) suitable for being triggered in a time-correlated manner with the power supply to said secondary electronic unit (BA); and is suitable for performing internally at least one measurement of a voltage (VH, VL) when it is powered, said at least one measurement of a voltage (Continued)

(VH, VL) representing the position (PosB) of said secondary electronic unit (BA) on the motor vehicle (V).

13 Claims, 7 Drawing Sheets

(58) Field of Classification Search
USPC .......................................... 342/451, 147, 352
See application file for complete search history.

(56) References Cited

U.S. PATENT DOCUMENTS

| | | | | |
|---|---|---|---|---|
| 2015/0217640 A1* | 8/2015 | Bissontz | ................ | B60L 15/20 |
| | | | | 307/9.1 |
| 2016/0313636 A1* | 10/2016 | Chien | ..................... | F21S 9/022 |
| 2017/0182924 A1* | 6/2017 | Lendo | ..................... | H02J 7/025 |
| 2018/0065450 A1* | 3/2018 | Hurst | ................ | B60H 1/00428 |

FOREIGN PATENT DOCUMENTS

| | | | |
|---|---|---|---|
| JP | 2009084929 A | | 4/2009 |
| JP | 2013044687 A | | 3/2013 |
| WO | 2016198640 A1 | | 12/2016 |

\* cited by examiner

| Bv+ | BvH | BvL | Bv- | BaH | BaL | PosB |
|---|---|---|---|---|---|---|
| | | | | | | 0 |
| | | | | Vbat 2/3 | Vbat 1/3 | 0x01 |
| ●——● | | | | Vbat | VBat/2 | 0x02 |
| ●——● | | ●——● | | Vbat | Vbat | 0x03 |
| | ●——● | | | VBat/2 | VBat/2 | 0x04 |
| | ●——● | ●——● | | GND | GND | 0x05 |
| | | ●——● | | VBat/2 | GND | 0x06 |
| ●——● | | ●——● | | Vbat | GND | 0x07 |

DEVICE FOR IDENTIFYING A POSITION OF AN ELECTRONIC UNIT ON A MOTOR VEHICLE

TECHNICAL FIELD OF THE INVENTION

The present invention relates to a device for identifying a position of a secondary electronic unit on a motor vehicle. It is applicable in particular but in a nonlimiting manner to the field of motor vehicles.

TECHNOLOGICAL BACKGROUND OF THE INVENTION

In the field of motor vehicles, the identification of a position of a secondary electronic unit, such as a beacon, on a motor vehicle is performed when it is installed on the motor vehicle through an operator. To this end, in a so-called learning phase, the operator uses specific hardware to read a barcode on each secondary electronic unit before mounting it on the motor vehicle and associates it with the position in which it is mounted on the motor vehicle. He or she then informs a database which will be accessible by the motor vehicle.

One drawback with this state of the art is that this learning phase takes too long and is costly because it requires a manual operation with specific hardware.

GENERAL DESCRIPTION OF THE INVENTION

To this end, the invention proposes a device for identifying a position of a secondary electronic unit on a motor vehicle, wherein said identification device comprises:
- a central electronic unit suitable for managing the power supply of a plurality of secondary electronic units and comprising a switching device for switching the power supply of all the secondary electronic units;
- a main timer suitable for being triggered in a time-correlated manner with the activation of the power supply of said secondary electronic units by said switching device;
- said plurality of secondary electronic units, each secondary electronic unit:
  - comprising a secondary timer suitable for being triggered in a time-correlated manner with the power supply of said secondary electronic unit;
  - being suitable for performing at least one internal voltage measurement when it is powered, said at least one voltage measurement being representative of the position of said secondary electronic unit on said motor vehicle.

Thus, as will be seen in detail hereinbelow, through the activation of the power supply of all the secondary electronic units, said secondary electronic units will be able to know their position by performing internal voltage measurements and returning it to said central electronic unit together with their identifier. Said central electronic unit will thus be able to associate each received identifier with a position. Moreover, through a correlation between the main timer and the secondary timers, the central electronic unit can check that the secondary electronic unit whose power supply has just been activated does indeed belong to the motor vehicle and not to another motor vehicle. The pairing of a secondary electronic unit to a given motor vehicle is thus performed.

According to nonlimiting embodiments, the identification device can also comprise one or more additional features out of the following.

According to a nonlimiting embodiment, a secondary electronic unit is a beacon.

According to a nonlimiting embodiment, the switching device is suitable for activating the power supply of said plurality of secondary electronic units simultaneously.

According to a nonlimiting embodiment, a secondary electronic unit comprises a connector comprising a power supply pin, a ground pin and at least one acquisition pin from which said at least one voltage measurement is performed.

According to a nonlimiting embodiment, a secondary electronic unit is suitable for performing two voltage measurements.

According to a nonlimiting embodiment, the two voltage measurements form a combination which is representative of the position of said secondary electronic unit and said combination is different from one secondary electronic unit to another on said motor vehicle.

According to a nonlimiting embodiment, said connector of said secondary electronic unit is suitable for being connected to a vehicle connector, the latter comprising a power supply pin, a ground pin and at least one coding pin and at least one resistor linked to at least two pins out of said power supply pin, said ground pin and said at least one coding pin and wherein said at least one voltage measurement is a function of a value of said at least one resistor.

According to a nonlimiting embodiment, said vehicle connector comprises two coding pins.

According to a nonlimiting embodiment, the value of said at least one resistor is defined so as to generate a short-circuit between said at least two pins to which said at least one resistor is linked.

According to a nonlimiting embodiment, when it is powered, a secondary electronic unit is suitable for broadcasting an advertising frame comprising an identifier, its position on the motor vehicle and said secondary timer.

According to a nonlimiting embodiment, said central electronic unit is suitable for:
- receiving said advertising frame broadcast by said secondary electronic unit;
- correlating said secondary timer with said main timer so as to check that said secondary electronic unit belongs to said motor vehicle;
- saving in memory said position with said identifier of said secondary electronic unit received in said advertising frame.

According to a nonlimiting embodiment, said central electronic unit is also suitable for transmitting to said user terminal said identifier and said associated position of each secondary electronic unit on the motor vehicle.

According to a nonlimiting embodiment, said central electronic unit is also suitable for:
- deactivating the power supply of all the secondary electronic units simultaneously; and
- reactivating the power supply of all the secondary electronic units simultaneously.

According to a nonlimiting embodiment, said switching device comprises a single switch associated with all the secondary electronic units.

According to a nonlimiting embodiment, said central electronic unit is a computer that can be connected to a network of the motor vehicle or is suitable for cooperating with a computer that can be connected to a network of the motor vehicle.

According to a nonlimiting embodiment, said central electronic unit and said secondary electronic units are suitable for communicating with a user terminal according to a Bluetooth™ communication protocol. In a nonlimiting variant embodiment, the communication protocol is Bluetooth Low Energy™.

According to a nonlimiting embodiment, the user terminal is an identifier, a cellphone, a tablet, a badge.

BRIEF DESCRIPTION OF THE FIGURES

The invention and its various applications will be better understood on reading the following description and on studying the accompanying figures.

DESCRIPTION OF EMBODIMENTS OF THE INVENTION

The elements that are identical, by structure or by function, and that appear in different figures retain, unless specified otherwise, the same references.

The invention relates to a device DISP for identifying a position of a secondary electronic unit on a motor vehicle.

Figure 1A:
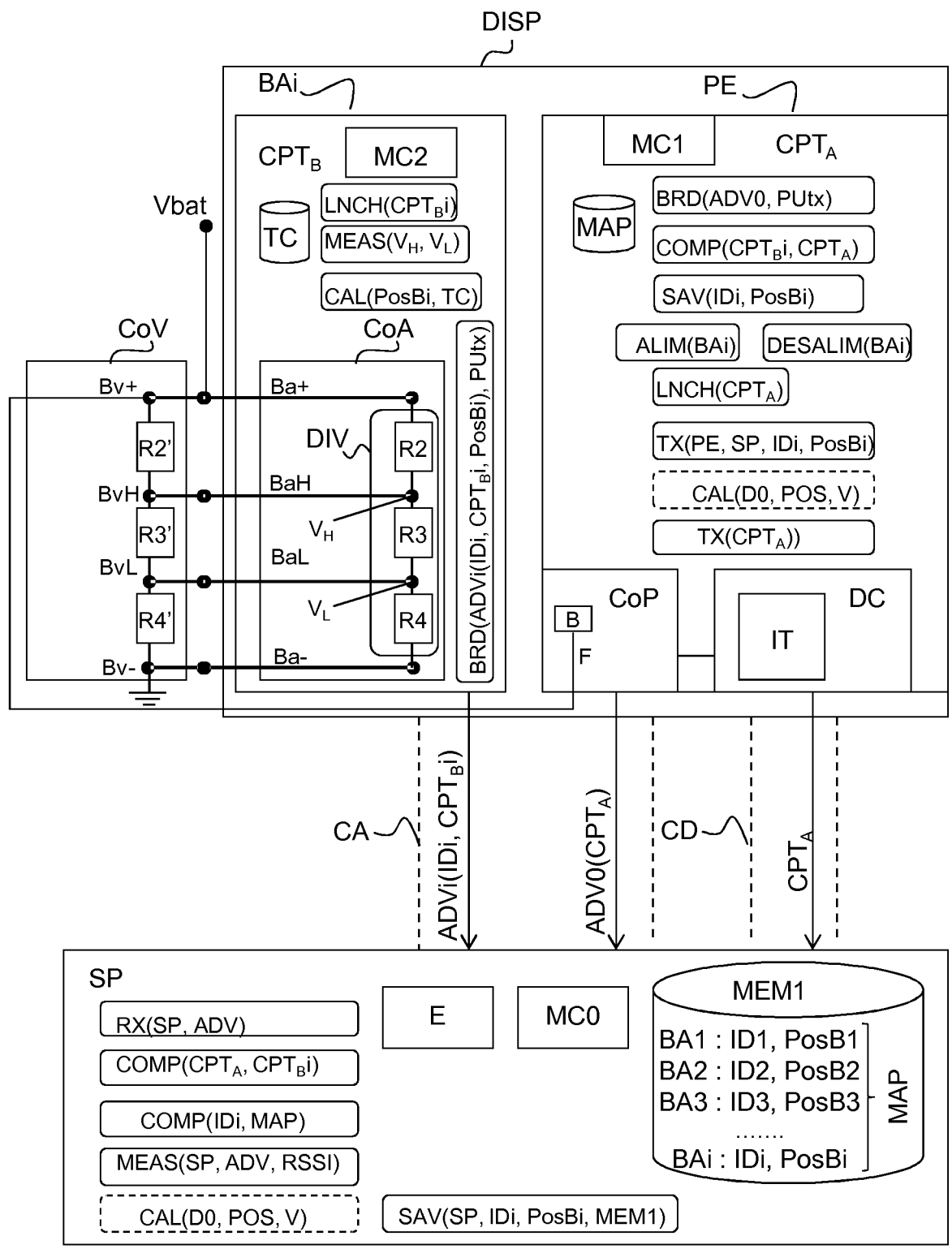
FIG. 1a represents a diagram of a device for identifying a position of a secondary electronic unit on a motor vehicle, according to a first nonlimiting embodiment of the invention, said identification device comprising a central electronic unit and a plurality of secondary electronic units.
Figure 1B:
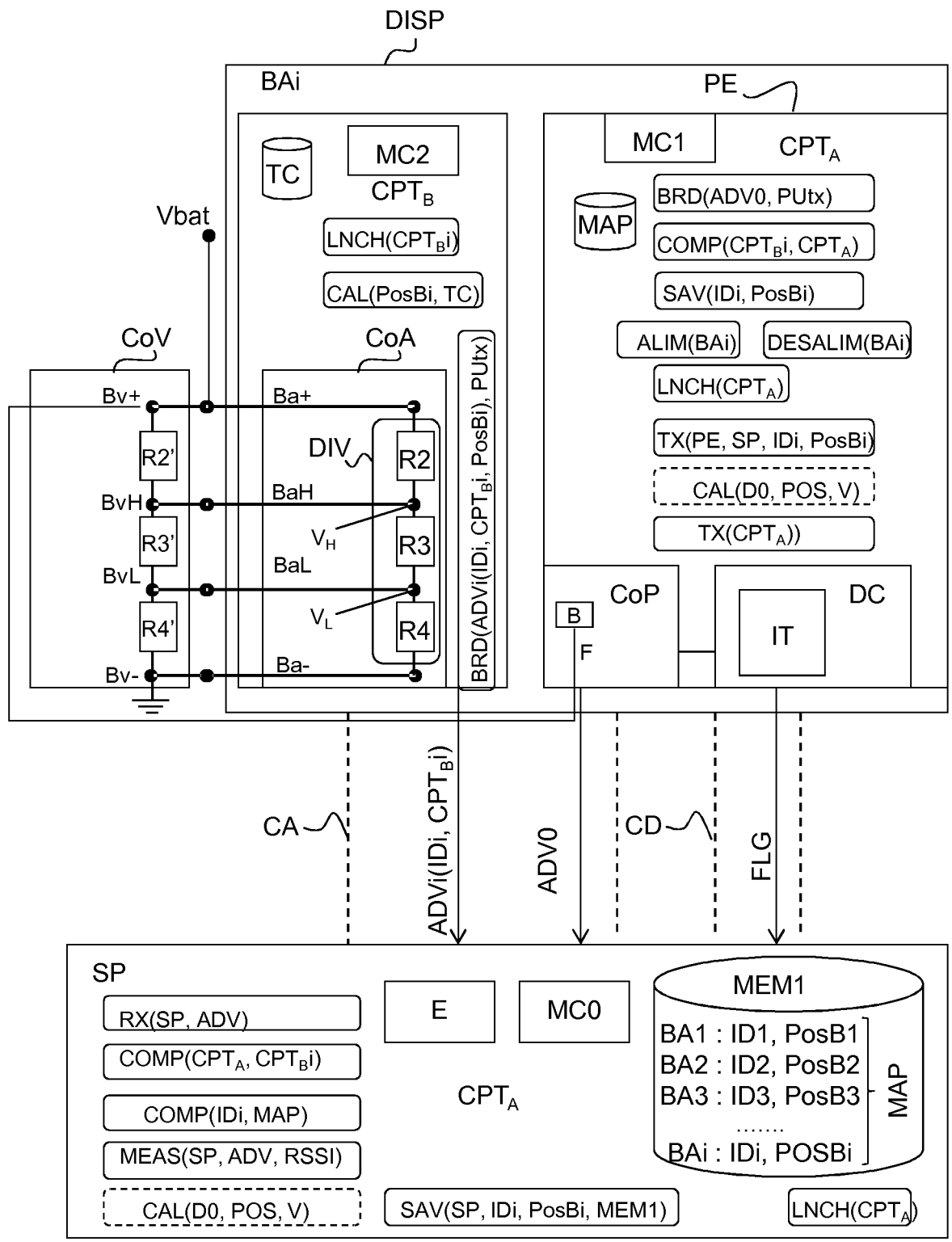
FIG. 1b represents a diagram of a device for identifying a position of a secondary electronic unit on a motor vehicle, according to a second nonlimiting embodiment of the invention.

Said identification device DISP is described with reference to FIGS. 1a to 8. As illustrated in FIGS. 1a and 1b, the identification device DISP comprises:
- a central electronic unit PE suitable for managing the power supply Vcc of a plurality of secondary electronic units BA;
- at least one main timer $CPT_A$; and
- said plurality of secondary electronic units BA.

Said central electronic unit PE and said secondary electronic units BA are suitable for communicating with a user terminal SP. In a nonlimiting embodiment, they communicate with said user terminal SP according to a Bluetooth™ communication protocol or Bluetooth Low Energy™ communication protocol, called BLE.

For the rest of the description, the term unit will be used to indicate a user terminal SP or a secondary electronic unit BA or a central electronic unit PE. In a nonlimiting embodiment, the secondary electronic unit BA is a beacon. Hereinafter in the description, the term secondary electronic unit or beacon will be used without differentiation.

Figure 2:
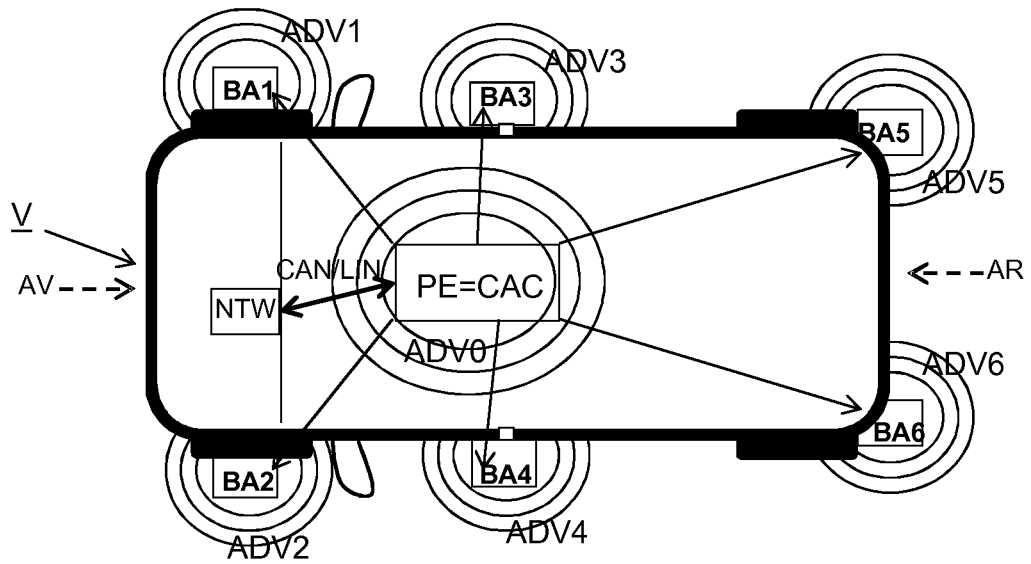
FIG. 2 represents an architecture of the identification device of FIG. 1a or 1b, according to a first nonlimiting embodiment.
Figure 3:
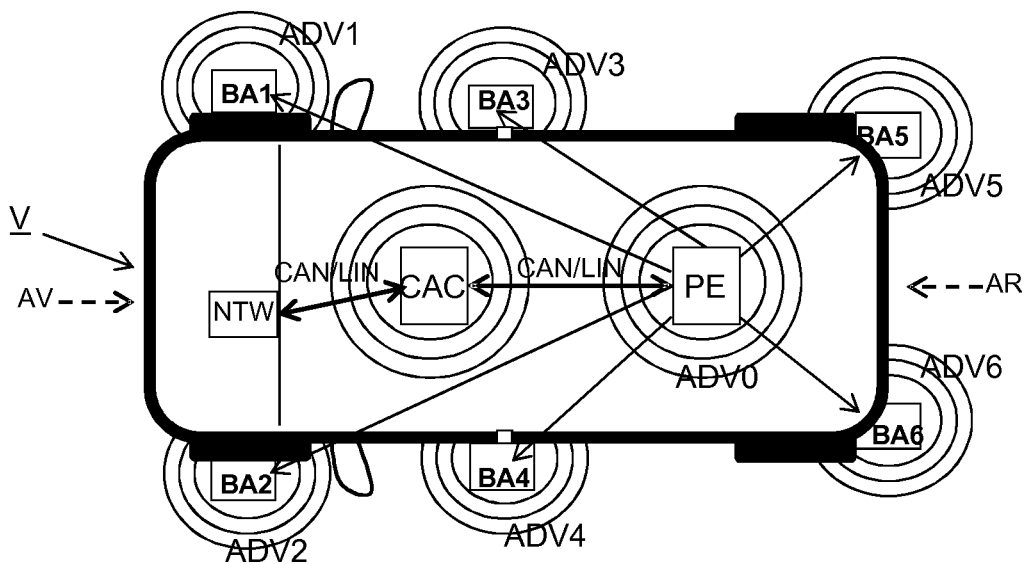
FIG. 3 represents an architecture of the identification device of FIG. 1a or 1b, according to a second nonlimiting embodiment.

In a nonlimiting example illustrated in FIGS. 2 and 3, the identification device DISP comprises six beacons BA1 to BA6.

Architecture

The identification device DISP can have different architectures which are described hereinbelow according to nonlimiting embodiments.

In a first nonlimiting embodiment illustrated in FIG. 2, said central electronic unit PE is a computer CAC that can be connected to a network NTW of the motor vehicle V. This network is, in a nonlimiting example, an LIN or CAN network.

In a second nonlimiting embodiment illustrated in FIG. 3, said central electronic unit PE is suitable for cooperating with a computer CAC that can be connected with a network NTW of the motor vehicle V. The connectable computer CAC communicates with the user terminal SP via a BLE or Bluetooth™ communication. This embodiment is advantageous when it is not possible to incorporate a switching device DC in a standard connectable computer of a motor vehicle, in particular to add to it power supply and/or ground pins B (described later). In this second embodiment, the central electronic unit PE cooperates with the connectable computer CAC via the LIN ("Local internetwork") or CAN ("Controller Area Network") network of the motor vehicle V. The central electronic unit PE thus serves as a gateway for the management of the power supply Vcc of the beacons BA. It will be noted that, after the execution of the initialization phase PH0 described later, the central electronic unit PE returns to the computer CAC a list MAP of the beacons BA and of their position PosB given via the LIN/CAN network and the computer CAC transmits this list to the user terminal SP.

The user terminal SP and the elements of the identification device DISP are described in detail hereinbelow.

User Terminal SP

The user terminal SP is illustrated in FIGS. 1a and 1b.

In a nonlimiting embodiment, the user terminal SP comprises a display screen E.

A user can control the execution of a function Fct by means of the user terminal SP. In nonlimiting embodiments, the function Fct is a locking/unlocking of the motor vehicle V to access said motor vehicle V or a starting of the motor vehicle V or any other function requiring a location of the user terminal SP. The function Fct thus makes it possible to access the motor vehicle V, that is to say that it makes it possible to open/close an opening of the vehicle (door or trunk lid). The procedure for accessing a motor vehicle or for starting via a user terminal SP is well known to the person skilled in the art, so it is not described here.

In nonlimiting examples, the user terminal SP is an identifier, a badge, a tablet, a cellphone such as, in a nonlimiting example, a smartphone, used by a user of the motor vehicle V.

To be used with a motor vehicle V, the user terminal SP must be paired with said motor vehicle V. The pairing is performed after the user terminal SP has been authenticated when it is located in proximity to the motor vehicle V. Since such an authentication is known to the person skilled in the art, it is not described here. When the user terminal SP is paired, a secure communication channel is established with the motor vehicle V (via the central electronic unit PE or a computer CAC).

Moreover, for security reasons, the execution of a function Fct of the motor vehicle V is conditional on the location of the user terminal SP relative to the motor vehicle V, namely on the distance at which it is located relative to the motor vehicle V. In a nonlimiting example, the unlocking of the motor vehicle V can be performed when the user terminal SP is located close to the motor vehicle V, at a distance substantially less than or equal to 2 m (meters) in the nonlimiting example of the good practices recommended by the referring organizations in the field, like the British consortium "Thatcham".

The measurement of a distance between the user terminal SP and the motor vehicle V is performed by means of the measurement of the strength of a received signal whose initial strength is known, namely the transmitted strength of said signal is known, which makes it possible to deduce the distance between the transmitter and the receiver by an evaluation of the strength drop of the signal due to the free space which separates the motor vehicle V from the user terminal SP. Here, the transmitter is an electronic unit BA, or central unit PE of the motor vehicle V and the receiver is the user terminal SP.

This method is called measurement by RSSI ("Received Signal Strength Indication").

The user terminal SP is thus suitable for measuring the received strength RSSI of signals received (function illustrated in FIG. 1 MEAS(SP, ADV, RSSI)). Hereinafter in the description, the terms measurement of the received strength RSSI or RSSI measurement will be used without differentiation.

To improve the measurement of the distance, there are used a plurality of electronic units BA, PE and a location algorithm, is performed on the different received signals strength measurements. As will be seen hereinbelow, the signals received by the user terminal SP are advertising frames ADV broadcast by the electronic units BA, PE.

As illustrated, the user terminal SP comprises a wireless communication module MC0 which thus comprises a BLE antenna in a nonlimiting example which serves as transceiver.

The wireless communication module MC0 of the user terminal SP makes it possible to establish a wireless link (here "Bluetooth Low Energy™") with the wireless communication module MC2 of a beacon BA of the motor vehicle V or the wireless communication module MC1 of the central electronic unit PE. The wireless communication module MC0 of the user terminal SP is suitable for being in a scanning mode. To this end, it is suitable for performing a scan of advertising channels CA to receive the advertising frames ADV broadcast by the electronic units BA or PE.

The user terminal SP is thus suitable for receiving the advertising frames broadcast by the electronic units BA or PE (function illustrated in FIG. 1 RX(SP, ADV)).

Moreover, the user terminal SP is suitable for saving in memory MEM1 a list MAP of the identifiers ID of the beacons BA and their respective position PosB, a list which was established in an initialization phase PH0 described later (function illustrated in FIG. 1 SAV(SP, IDi, PosBi, MEM1)).

Finally, during an operating phase PH1 described later, the user terminal SP is suitable for:

comparing an identifier ID of the beacon BA received in an advertising frame ADV broadcast by said beacon BA with the identifiers originating from said list and saved in memory (function illustrated in FIG. 1 COMP (IDi, MAP)); and comparing a secondary timer $CPT_B$ of said beacon BA received in an advertising frame ADV broadcast by said beacon BA with the main timer $CPT_A$ received (function illustrated in FIG. 1 COMP($CPT_A$, $CPT_B$i)).

The secondary timer CPT and the main timer CPT are described later. They make it possible in particular for the user terminal SP to check that a beacon BA has not been hacked.

In a nonlimiting embodiment, the user terminal SP is also suitable for calculating its position POS relative to the motor vehicle V, from each distance D0 at which it is located relative to each beacon BA (function illustrated by dotted lines in FIGS. 1a and 1b CAL(D0, POS, V)).

Central Electronic Unit PE

The central electronic unit PE is illustrated in FIGS. 1a and 1b.

The central electronic unit PE is also called central transceiver.

The central electronic unit PE is in a so-called connectable mode because it can establish a connection with the user terminal SP.

It is suitable for being in a broadcasting mode ("advertising" mode in Bluetooth™ technology) or in a scanning mode in Bluetooth™ technology. To this end, the central electronic unit PE comprises a wireless communication module MC1 which comprises a BLE antenna in a nonlimiting example which serves as transceiver.

In the broadcasting mode, the central electronic unit PE is suitable for broadcasting a plurality of advertising frames ADV (function illustrated in FIGS. 1a, 1b BRD(ADV0, PUtx)) in specific channels, called advertising channels CA that are distinct from data channels CD used to transmit frames for exchanging application data relating to established connections. The advertising channels CA are allocated on the 2.4 GHz frequency band.

In the scanning mode, the central electronic unit PE is suitable for performing a scan of said advertising channels CA to receive an advertising frame ADV broadcast by the secondary electronic units BA.

In addition to the advertising frames ADV, the central electronic unit PE can exchange data frames over data channels CD with the user terminal SP, these data channels CD forming part of a secure communication channel.

In a nonlimiting embodiment, the central electronic unit PE is suitable for:
validating the authentication of the user terminal SP which makes it possible to execute the function Fct;
activating the function to be executed Fct such as the locking/unlocking of the motor vehicle, the starting of the motor vehicle, etc.

The central electronic unit PE is also suitable for managing the power supply Vcc of the plurality of beacons BA. To this end, the central electronic unit PE comprises a switching device DC for switching the power supply Vcc of all the beacons BA. Via its switching device DC, the central electronic unit PE is suitable for:
activating the power supply Vcc of all the beacons BA (function illustrated in FIGS. 1a and 1b ALIM(BAi));
deactivating the power supply Vcc of all the beacons BA (function illustrated in FIGS. 1a and 1b DESALIM (BAi)).

During an initialization phase PH0, the central electronic unit PE is suitable for activating the power supply Vcc of all the beacons BA simultaneously. As will be seen later, that makes it possible for all the beacons BA to determine their own position PosB, which will make it possible to establish a correlation between a position PosB in a predefined list of positions PosB and a given beacon BA.

When a beacon BA is powered, it broadcasts an advertising frame ADV which comprises an identifier ID, a secondary timer $CPT_B$ and its own position PosB on the motor vehicle V that it has determined. On reception of the advertising frame ADV from said beacon BA, the central electronic unit PE will recover the identifier ID of the beacon BA and its position PosB and will thus be able to save in memory said beacon BA and said position PosB associated with said beacon BA.

It will also be noted that there is a risk of the advertising frames ADV of the motor vehicle V being confused with those of another motor vehicle parked nearby and giving erroneous information to the algorithm for locating the position POS of the user terminal SP, the latter being able to perform prohibited commands or not function correctly. To safeguard against this eventuality, it is necessary to associate the beacons BA via their unique identifier ID which was assigned to them when they were manufactured, with the motor vehicle V on which they have been installed. Thus, as will be seen later, through a time-related correlation of synchronous events, the central electronic unit PE will be able to determine whether a beacon BA does indeed belong to the motor vehicle V or not.

During an operating phase PH1, namely after the pairing of the user terminal SP, the central electronic unit PE is suitable for activating also the power supply Vcc of all the beacons BA simultaneously. That allows the user terminal SP to perform, for each beacon BA, the RSSI measurement of an advertising frame ADV from a beacon BA by knowing exactly the position PosB at which said beacon BA is located on the motor vehicle V and thus correctly determine the distance D0 at which the user terminal SP is located from a beacon BA, this distance D0 being a function of the position PosB of said beacon BA on the motor vehicle V.

In a nonlimiting embodiment, the central electronic unit PE is also suitable for calculating the position POS of the user terminal SP relative to the motor vehicle V, from each distance D0 at which it is located relative to each beacon BA (function illustrated by dotted lines in FIGS. 1a and 1b CAL(D0, POS, V)).

Switching Device DC

The switching device DC is suitable for activating or deactivating the power supply Vcc of a beacon BA.

In particular, during the initialization phase PH0, the switching device DC is suitable for:
  activating the power supply Vcc of said secondary electronic units BA simultaneously;
  deactivating the power supply Vcc of said secondary electronic units BA simultaneously.

Similarly, during the operating phase PH1, the switching device DC is suitable for activating the power supply Vcc of all the secondary electronic units BA simultaneously.

Figures 4, 5:
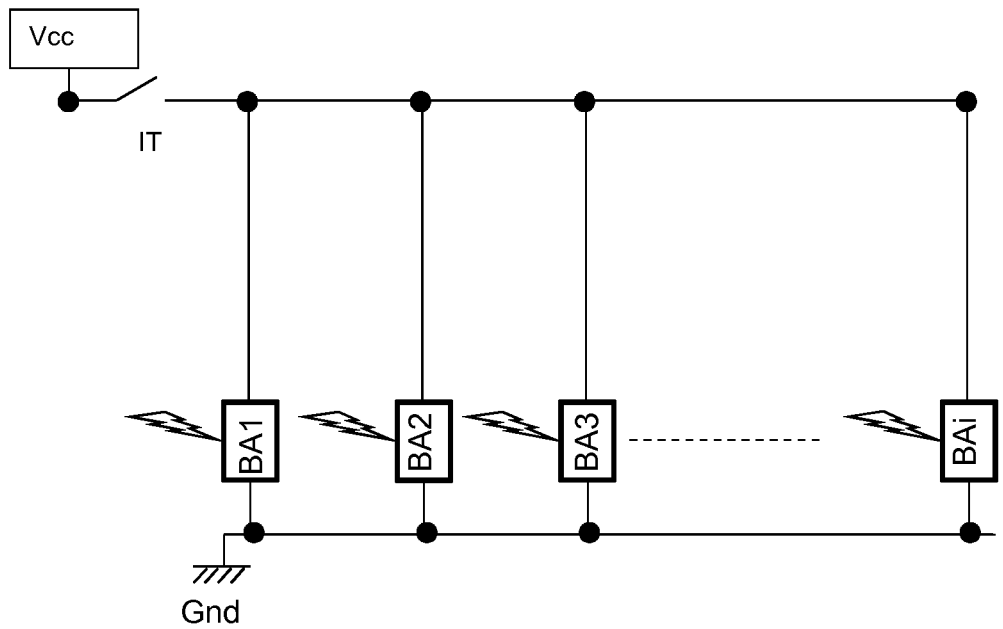
FIG. 4 represents a switching device of said central electronic unit of FIGS. 1a and 1b according to a nonlimiting embodiment.
FIG. 5 represents a coding table indicating a coding of short-circuits between different pins of a vehicle connector suitable for cooperating with a connector of a secondary electronic unit according to FIG. 1a or 1b, on which voltage measurements representative of the position of said secondary electronic unit are performed.

The switching device DC comprises a single switch IT associated with all the beacons BA as illustrated in FIG. 4, said switch IT being suitable for:
  being closed so as to activate the power supply Vcc of all the beacons BA;
  being opened so as to deactivate the power supply Vcc of all the beacons BA.

In a nonlimiting embodiment illustrated in FIG. 4, said beacons BA comprise a ground Gnd connected to the chassis of the motor vehicle. In another nonlimiting embodiment (not illustrated), each beacon BA comprises a ground wire linked to the ground of the central electronic unit PE.

In a nonlimiting embodiment, as illustrated in FIGS. 1a and 1b, said central electronic unit PE comprises a central connector CoP comprising a pin B, called power supply pin, linked to said switch IT. Said pin B makes it possible to link the central connector CoP to a vehicle connector CoV as illustrated in FIGS. 1a and 1b. The vehicle connector CoV is itself linked to a beacon connector CoA.

A single wire F links the pin B to the vehicle connector CoV, in particular to its power supply pin Bv+ (described later). The central connector CoP is small because it comprises only a single pin B. The central connector CoP thus makes it possible to link the central electronic unit PE to all the beacons BA via the different vehicle connectors CoV.

Thus, in the nonlimiting example of six beacons BAi (i=1 to 6), the central connector CoP is linked to six vehicle connectors CoV, each vehicle connector CoV being connected to one of the six beacons BA1 to BA6 via a beacon connector CoA. The central connector CoP thus comprises a power supply wire F which starts from its pin B and which makes it possible to link the central electronic unit PE to each of the six connectors CoV, and do so in parallel.

To activate the power supply of all the beacons BA, said switching device DC of the central electronic unit PE closes its switch IT which makes it possible to connect the pin B of the central connector CoP so as to activate the power supply Vcc of all the beacons BA. The connectors CoA of each of the beacons BA are thus each connected to an associated vehicle connector CoV.

To deactivate the power supply of all the beacons BA, said switching device DC of the central electronic unit PE opens its switch IT which makes it possible to disconnect the pin B of the central connector CoP so as to deactivate the power supply Vcc of all the beacons BA. The connectors CoA of each of the beacons BA are thus each disconnected from the associated vehicle connector CoV.

It will be noted that a vehicle connector CoV is a connector with at least three ways which comprises:
  a power supply pin Bv+ (hereinafter called pin Bv+) suitable for being linked to a battery of a motor vehicle V which supplies a battery voltage Vbat;
  a ground pin Bv− (hereinafter called pin Bv−) suitable for being linked to the chassis of the motor vehicle V;
  at least one coding pin BvH, BvL.

The vehicle connector CoV comprises at least one resistor R' arranged between at least two pins out of said pin Bv+, said pin Bv−, said at least one coding pin BvH, BvL.

In a nonlimiting embodiment illustrated in FIGS. 1a and 1b, the vehicle connector CoV comprises two coding pins, namely a primary coding pin BvH (hereinafter called pin BvH) and a secondary coding pin BvL (hereinafter called pin BvL).

In a nonlimiting embodiment illustrated in FIGS. 1a and 1b, the vehicle connector CoV comprises three resistors R2', R3' and R4' arranged respectively between the pins Bv+ BvH, BvH BvL and BvL Bv−.

In a nonlimiting embodiment, the three resistors R2', R3', R4' have the same value. In a nonlimiting embodiment, the three resistors R2', R3', R4' have different values. Obviously, it is possible to have two resistors which have the same value and a third which has a value different from the other two.

Different combinations of values of the three resistors R2', R3', R4' will make it possible to obtain different combinations of measurements of different voltages $V_H$ and $V_L$ on a beacon connector CoA, and different combinations of voltage measurements $V_H$ and $V_L$ will make it possible to define different possible positions PosB for a beacon BA. Thus, a combination of voltage measurements $V_H$ and $V_L$ will be representative of a possible position PosB for a beacon BA.

In a nonlimiting variant embodiment, at least one resistor R2', R3', R4' is defined so as to generate a short-circuit CC between at least two pins out of said pin Bv+, said pin Bv−, said two coding pins BvH, BvL to which said at least one resistor is linked. Thus, at least one resistor is substantially equal to 0Ω which corresponds to having a short-circuit between the two pins to which said resistor is linked. This variant embodiment is simple to produce and inexpensive.

Thus, a short-circuit CC can be produced between at least two pins Bv+, Bv−, BvH, BvL of said vehicle connector CoV of each beacon BA which is powered. Obviously, no short-circuit CC can be produced between the pin Bv+ and the pin Bv−.

It will be noted that the connectors CoV are powered at the same time as the beacons BA are powered.

Thus, in a nonlimiting exemplary embodiment, as illustrated in the coding table TC of FIG. 5, a short-circuit CC can be produced between:
- the pins Bv+ BvH; or
- the pins Bv+ BvH, and BvH BvL; or
- the pins BvH BvL; or
- the pins BvH BvL and BvL Bv−; or
- the pins BvL Bv−; or
- the pins Bv+ BvH and BvL Bv−.

Obviously, it is possible to have other combinations of short-circuits.

Thus, based on the location of the vehicle connector CoV on the motor vehicle V (which corresponds to the location of the beacon BA whose beacon connector CoA will be connected to said vehicle connector CoV), in this nonlimiting variant embodiment, shunts are performed as defined in the coding table TC.

It will be noted that the central electronic unit PE comprises, in memory, a list of possible positions PosB for the beacons BA. This list is predefined by the motor vehicle constructor for example. In a nonlimiting embodiment, there are as many positions PosB as there are beacons BA.

In the nonlimiting example of six beacons BA1 to BA6, six positions PosB1 to PosB6 are predefined and are, in a nonlimiting example as illustrated in FIGS. 2 and 3:
- PosB1: on the front right tire;
- PosB2: on the front left tire;
- PosB3: on the right hand doors;
- PosB4: on the left hand doors;
- PosB5: on the right rear tire;
- PosB6: on the left rear tire.

In a nonlimiting embodiment, a number is assigned to a position PosB. Thus, the numbers 0x01 to 0x06 are assigned.

The central electronic unit PE thus knows the list of the six possible positions PosB1 to PosB6 for a beacon BA, but, when they are installed on the motor vehicle V, the central electronic unit PE does not know at the outset the position PosB at which the beacons BA are installed. So, the central electronic unit PE has to identify the beacons BA and identify the position PosB at which they have been installed on the motor vehicle V. This is done during the initialization phase PH0.

During this initialization phase PH0, the beacons BA perform at least one voltage measurement $V_H$, $V_L$ on their beacon connector CoA and, from this at least one voltage measurement $V_H$, $V_L$, determine their own position PosB on the motor vehicle V according to the coding table of FIG. 5. Then, the beacons BA will send their position PosB to the central electronic unit PE which will save it in memory (function illustrated in FIGS. 1a and 1b SAV(IDi, PosBi)). The central electronic unit PE will thus have in memory the list MAP of the identifiers ID of each beacon BA associated with their respective position PosB. In the nonlimiting example, it will thus have in memory an identifier ID of a beacon BA associated with a position number PosB.

When the central electronic unit PE knows all the positions PosB respectively associated with the different beacons BA, it is subsequently suitable for transmitting to said user terminal SP the identifier ID and the associated position PosB of each beacon BA on the motor vehicle V via a secure communication channel (function illustrated in FIGS. 1a and 1b TX(PE, SP, IDi, PosBi)), namely in a data channel CD via a data frame.

Main Timer CPTA

The main timer $CPT_A$ is suitable for being triggered in a time-related correlation with the activation of the power supply Vcc of all the beacons BA. Namely, it is triggered at the same time as the activation of said power supply Vcc or with a time offset known to the user terminal SP.

The main timer $CPT_A$ is initialized with a predefined initial value which is known to the central electronic unit PE (or to the computer CAC) and to the user terminal SP. In a nonlimiting example, this initial value is equal to zero. The main timer $CPT_A$ is incremented on each time interval T1. This time interval T1 is a time interval between two broadcasts of an advertising frame ADV by a beacon BA or by the central electronic unit PE. In a nonlimiting example, this time interval is equal to 100 ms (milliseconds). Thus, the main timer $CPT_A$ is incremented every 100 ms in a nonlimiting example. In a nonlimiting example, the main timer $CPT_A$ is incremented by one.

During the initialization phase PH0 described later, the main timer $CPT_A$ is managed by the central electronic unit PE or by the computer CAC seen previously. In this case, the central electronic unit PE or the computer CAC is suitable for:
- triggering said main timer $CPT_A$ in a time-correlated manner with the activation of the power supply Vcc of the beacons BA (function illustrated in FIGS. 1a and 1b LNCH ($CPT_A$)).

During the operating phase PH1 described later, in a first nonlimiting embodiment illustrated in FIG. 1a, the main timer $CPT_A$ is also managed by the central electronic unit PE or the computer CAC. In this case, the central electronic unit PE (or the computer CAC) is suitable for:
- triggering said main timer $CPT_A$ in a time-correlated manner with the activation of the power supply Vcc of the beacons BA (function illustrated in FIGS. 1a and 1b LNCH($CPT_A$));
- transmitting said main timer $CPT_A$ to the user terminal SP via a secure communication channel (function illustrated in FIGS. 1a and 1b TX($CPT_A$)), namely in a data channel CD via a data frame.

During the operating phase PH1 described later, in a second nonlimiting embodiment illustrated in FIG. 1b, the main timer $CPT_A$ is managed by the user terminal SP. In this case, the central electronic unit PE (or the computer CAC) is suitable for transmitting to the user terminal SP a flag FLG indicating to it that the beacons BA have just been powered via a secure communication channel. On receipt of this flag FLG, said user terminal SP is suitable for triggering said main timer $CPT_A$ and for incrementing it.

In a nonlimiting embodiment, a single main timer $CPT_A$ is used.

The main $CPT_A$ and secondary $CPT_B$ timers are used during an initialization phase PH0.

During the initialization phase PH0, the central electronic unit PE is suitable for receiving the secondary timers $CPT_B$ from the beacons BA which are in the process of being powered via an advertising frame ADV sent by said beacons BA. The secondary timers $CPT_B$ are synchronous with the main timer $CPT_A$. The central electronic unit PE is thus suitable for correlating said secondary timers $CPT_B$ with the main timer $CPT_A$ so as to check that said beacons BA do indeed belong to said motor vehicle BA (function illustrated in FIGS. 1a and 1b COMP($CPT_B$i, $CPT_A$)). It will be noted that the probability of a beacon BA of another motor vehicle being powered at the same moment as the beacon BA of the motor vehicle V concerned is relatively low. At the end of this initialization phase PH0, the central electronic unit PE therefore knows the unique identifier ID of the beacon BA for which it has just switched the power supply Vcc, and its position PosB. At the end of the initialization phase PH0, when the central electronic unit PE is the holder of all the identifiers ID of all the beacons BA and of their respective positions PosB, it can transfer the list MAP of all these identifiers ID with their associated position PosB to the user terminal SP which has to use them for its location POS. It is then no longer possible for the user terminal SP to confuse two motor vehicles.

It will be noted that the initialization phase PH0 can be repeated several times to reduce the probability of error upon the reception of the values of the secondary timers $CPT_B$. Namely, the power supplies Vcc of all the beacons BA are cut then reactivated.

The main $CPT_A$ and secondary $CPT_B$ timers are used also during an operating phase PH1 described later.

In this operating phase PH1, the user terminal SP will be able to compare a secondary timer $CPT_B$ of a beacon BA with the associated main timer $CPT_A$ to check that, for example, the beacon BA has not been hacked.

It will be noted that there can be clock offsets in the time of the different secondary timers $CPT_B$, in particular if the clock is an oscillator composed of resonant elements exhibiting strong dispersions (oscillator based on resistance and capacitance, called RC oscillator). Indeed, such a clock is less accurate in time than a quartz clock for example. So, as soon as a secondary timer $CPT_B$ goes beyond a determined offset Off, in a nonlimiting embodiment, the central electronic unit PE is suitable for:
- deactivating the power supply Vcc of all the beacons BA simultaneously so as to reset all the secondary timers $CPT_B$ to their initial value;
- resetting the main timer $CPT_A$ to its initial value;
- reactivating the power supply Vcc of all the beacons BA simultaneously so as to once again trigger all the secondary timers $CPT_B$. They can then once again be incremented;
- once again triggering the main timer $CPT_A$. It can then once again be incremented at the same time as all the secondary timers $CPT_B$ of the beacons BA;
- informing the user terminal of the restarting of the main timer $CPT_A$.

Secondary Electronic Unit BA

As illustrated in FIGS. 2 and 3, in a nonlimiting example, the identification device DISP comprises six beacons BAi (i=1 to 6). The six beacons BA1 to BA6 are distributed all around the motor vehicle V and are at the positions PosB1 to PosB6 described previously.

A beacon BA is suitable for being in the broadcasting mode. To this end, the beacon BA comprises a wireless communication module MC2. A wireless communication module MC2 thus comprises a BLE antenna in a nonlimiting example which serves as transceiver. The beacon BA is suitable for broadcasting an advertising frame ADV in the advertising channels CA seen previously when it is powered, namely when it is powered up by the switching device DC of the central electronic unit PE (function illustrated in FIGS. 1a and 1b BRD(ADV(IDi, $CPT_B$i), PUtx)).

A beacon BA broadcasts a same advertising frame ADV several times sequentially on the advertising channels CA. An advertising frame ADV is thus broadcast repeatedly according to a regular or non-regular time interval T1 seen previously.

The advertising frame ADV comprises:
- an identifier ID, such as, in a nonlimiting example, an MAC (Media Access Control) address. This identifier is unique for each beacon BA installed on a motor vehicle V;
- a secondary timer $CPT_B$;
- information INF which indicates:
  - that the beacon BA can or cannot be connected with another unit;
  - the transmitted strength PUtx of the advertising frame ADV,
- its position PosB, namely here its position number.

A beacon BA thus comprises a secondary timer $CPT_B$ suitable for being triggered in a time-correlated manner with the power supply of said beacon BA. Namely, it is triggered at the same time as the activation of said power supply Vcc or with a time offset known to the user terminal SP.

Thus, the beacon BA is suitable for triggering said secondary timer $CPT_B$ in a time-correlated manner with its power supply (function illustrated in FIGS. 1a and 1b LNCH($CPT_B$i)). The secondary timers $CPT_B$ of the beacons BA are all triggered at the same time.

The secondary timer $CPT_B$ is initialized with a predefined initial value which is known to the beacon BA and to the user terminal SP. In a nonlimiting example, this initial value is equal to zero.

In a nonlimiting embodiment, the secondary timers $CPT_B$ of the beacons BA are all initialized with the same initial value. That makes it possible to have a simple management of the secondary timers $CPT_B$.

The secondary timer $CPT_B$ is incremented on each time interval T1. Thus, the secondary timer $CPT_B$ is incremented every 100 ms in a nonlimiting example.

In a nonlimiting embodiment, a beacon BA is in a so-called non-connectable mode, it cannot establish a connection with the user terminal SP. It simply broadcasts advertising frames ADV. It does not need to connect with the user terminal SP.

A beacon BA is suitable for performing at least one internal voltage measurement $V_H$, $V_L$ when it is powered (function illustrated in FIGS. 1a and 1b MEAS($V_H$, $V_L$)).

A beacon BA comprises a connector CoA, called beacon connector CoA.

The beacon connector CoA comprises:
- a power supply pin Ba+ (called pin Ba+) suitable for being linked to a battery of a motor vehicle V which supplies a battery voltage Vbat;
- a ground pin Ba− (called pin Ba−) suitable for being linked to the chassis of the motor vehicle V;
- at least one acquisition pin BaH, BaL from which, when it is powered, a voltage measurement $V_H$, $V_L$ is performed.

Said at least one voltage measurement $V_H$, $V_L$ is a function of a value of said at least one resistor R2', R3', R4' of said vehicle connector CoV.

In a nonlimiting embodiment, two voltage measurements $V_H$, $V_L$ are performed. The two voltage measurements $V_H$, $V_L$ form a combination which is representative of the position PosB of said beacon BA and said combination is different from one beacon BA to another on said motor vehicle V.

To this end, in a nonlimiting embodiment illustrated in FIGS. 1*a* and 1*b*, the beacon connector CoA comprises two acquisition pins, namely a primary acquisition pin BaH (called pin BaH) and a secondary acquisition pin BaL (called pin BaL).

The beacon connector CoA is suitable for being connected to the vehicle connector CoV. In particular, the power supply Ba+, ground Ba−, primary acquisition BaH and secondary acquisition BaL pins are connected respectively to the power supply Bv+, ground Bv−, primary coding BvH and secondary coding BvL pins of the vehicle connector CoV.

Each beacon BA also comprises a voltage divider DIV which will make it possible to have different voltage measurements $V_H$, $V_L$ on its pins BaH and BaL as a function of the values of resistors R2', R3' and R4' in the vehicle connector CoV to which the beacon BA can be connected.

In a nonlimiting embodiment illustrated in FIGS. 1*a* and 1*b*, the voltage divider DIV comprises three resistors R2, R3 and R4 distributed respectively between the terminals Ba+ BaH, BaH BaL and BaL Ba−.

In a nonlimiting embodiment, the three resistors R2, R3 and R4 have the same value. That makes it possible to obtain an optimum for discriminating the different voltage measurements $V_H$, $V_L$.

In a nonlimiting embodiment, the value of the three resistors R2, R3 and R4 is equal to 100 kΩ·(ohms). This value avoids any leakage current in the beacon BA. Moreover, that makes it possible to have a great distance in terms of voltage between the two primary BaH and secondary BaL acquisition pins, which reduces the possible acquisition errors, namely the errors on the voltage measurements $V_H$ and $V_L$.

The coding table TC of FIG. 5 shows a coding of possible positions PosB of a beacon BA as a function of combinations of voltage measurements, a combination being a function here of the absence or of the presence of a short-circuit CC produced between at least two pins of the vehicle connector CoV.

Figure 6A:
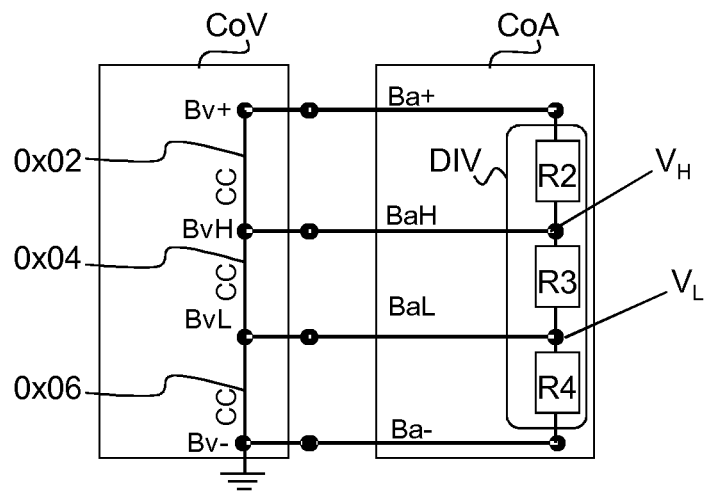
FIGS. 6a to 6d represent different short-circuits produced in a vehicle connector as defined in the coding table of FIG. 5.
Figure 6B:
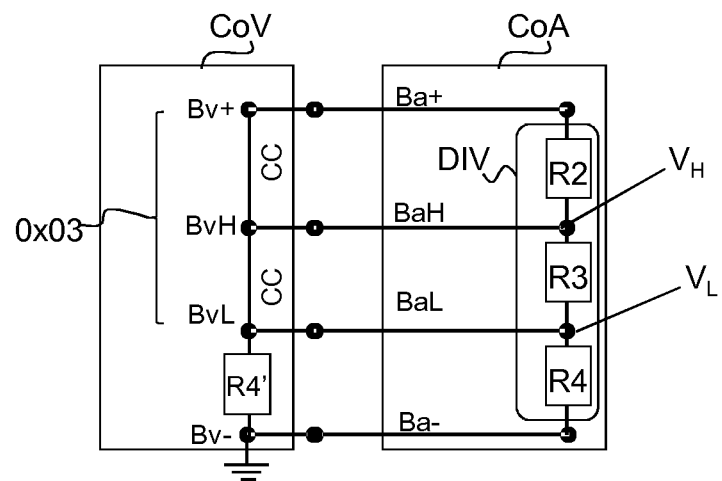
Figure 6C:
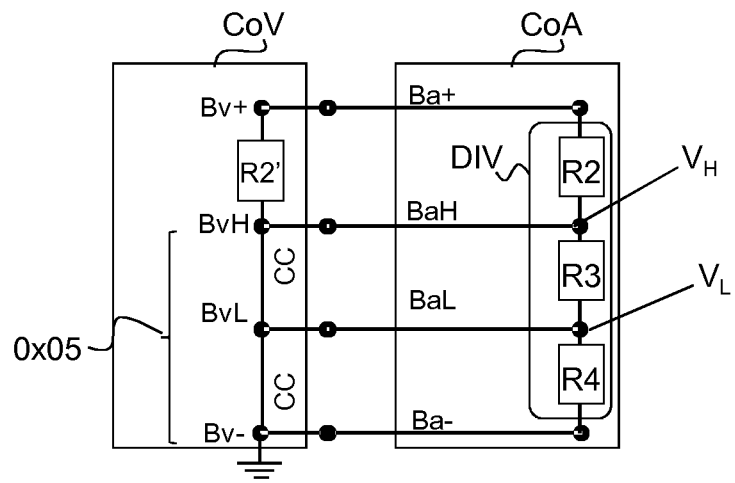
Figure 6D:
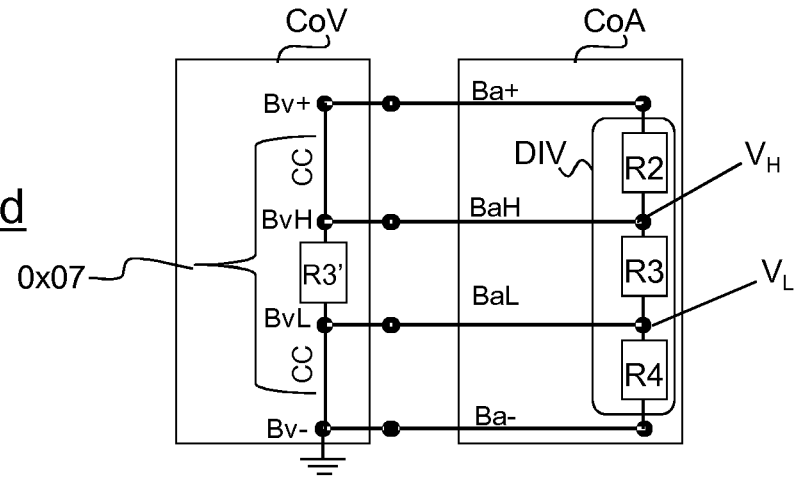

Thus, as illustrated in FIG. 5:

a) if there is no short-circuit CC (the resistors R2', R3' and R4' of the vehicle connector CoV are infinite or very high), the voltage measurements at the pins BaH and BaL of the beacon BA are respectively equal to ⅔*Vbat and ⅓*Vbat, which corresponds to the position 0x01. In this case, in a nonlimiting embodiment, the values of the resistors R2', R3' and R4' are respectively equal to those of the resistors R2, R3 and R4;

b) if there is a short-circuit CC (as illustrated in FIG. 6*a*) between the terminal Bv+ and the terminal BvH of the vehicle connector CoV, the voltage measurements at the pins BaH and BaL of the beacon BA are respectively equal to Vbat and Vbat/2, with Vbat being the power supply voltage Vcc of the beacons BA (which is equal to a battery voltage), which corresponds to the position 0x02. In this case, in a nonlimiting embodiment, the value of the resistor R2' is substantially equal to zero and the values of the resistors R3' and R4' are respectively equal to those of the resistors R3 and R4;

c) if there is a short-circuit CC (as illustrated in FIG. 6*b*) between the terminal Bv+ and the terminal BvH, and the terminal BvH and the terminal BvL of the vehicle connector CoV, the voltage measurements at the pins BaH and BaL of the beacon BA are respectively equal to Vbat and Vbat which corresponds to the position 0x03. In this case, in a nonlimiting embodiment, the value of the resistors R2' and R3' is substantially equal to zero and the value of the resistor R4' is equal to that of the resistor R4;

d) if there is a short-circuit CC (as illustrated in FIG. 6*a*) between the terminal BvH and the terminal BvL of the vehicle connector CoV, the voltage measurements at the pins BaH and BaL of the beacon BA are respectively equal to Vbat/2 and Vbat/2 which corresponds to the position 0x04. In this case, in a nonlimiting embodiment, the value of the resistor R3' is substantially equal to zero and the values of the resistors R2' and R4' are respectively equal to those of the resistors R2 and R4;

e) if there is a short-circuit CC (as illustrated in FIG. 6*c*) between the terminal BvH and the terminal BvL, and the terminal BvL and the terminal Bv− of the vehicle connector CoV, the voltage measurements at the pins BaH and BaL of the beacon BA are respectively equal to the ground Gnd which corresponds to the position 0x05. In this case, in a nonlimiting embodiment, the value of the resistors R3' and R4' is substantially equal to zero and the value of the resistor R2' is equal to that of the resistor R2;

f) if there is a short-circuit CC (as illustrated in FIG. 6*a*) between the terminal BvL and the terminal Bv− of the vehicle connector CoV, the voltage measurements at the pins BaH and BaL of the beacon BA are respectively equal to Vbat/2 and to the ground Gnd which corresponds to the position 0x06. In this case, in a nonlimiting embodiment, the value of the resistor R4' is substantially equal to zero and the values of the resistors R2' and R3' are respectively equal to those of the resistors R2 and R3;

g) if there is a short-circuit CC (as illustrated in FIG. 6*d*) between the terminal Bv+ and the terminal BvH, and the terminal BvL and Bv− of the vehicle connector CoV, the voltage measurements at the pins BaH and BaL of the beacon BA are respectively equal to Vbat and to the ground Gnd which corresponds to the position 0x07. In this case, in a nonlimiting embodiment, the value of the resistors R2' and R4' is substantially equal to zero and the value of the resistor R3' is equal to that of the resistor R3.

Thus, each combination of the voltage measurements $V_H$ and $V_L$ on the pins BaH and BaL of the beacon BA is representative of a position PosB of the beacon BA on the motor vehicle V.

Thus, the combinations a) to f) described above and illustrated in the coding table TC of FIG. 5 are associated respectively with the positions 0x01 to 0x06 on the motor vehicle V, namely with the positions PosB1 to PosB6 described previously, a seventh position PosB7 being able to be also defined according to the combination g) of the coding table TC of FIG. 5.

Thus, when it is powered, as a function of the voltage measurements $V_H$ and $V_L$ that it will perform on its pins BaH and BaL, a beacon BA will determine its own position PosB on the motor vehicle V as a function of the coding table TC.

It will be noted that a beacon BA will have in memory the list of correlations between the combination of the voltage measurements $V_H$ and $V_L$ at the pins BaH and BaL and the positions PosB1 to PosB6, namely the coding table TC.

If the measured voltages $V_H$ and $V_L$ do not correspond to any combination in the list of correlations, that means that there is a fault or a problem and the beacon BA is unable to determine its position PosB on the motor vehicle V. In this case, it returns a position 0 (illustrated in FIG. 5) to the central electronic unit PE.

It will be noted that the coding table TC illustrated in FIG. 5 is a nonlimiting example with values of resistors R2', R3', R4' which make it possible to generate a short-circuit CC between two pins of the vehicle connector CoV to which each resistor is linked. Thus, the coding table TC can vary according to whether:

the values of the resistors R2', R3', R4' are identical:
the values of the resistors R2', R3', R4' are made to vary;
the values of the resistors R2', R3', R4' are different from one beacon BA to the other.

Thus, from one beacon BA to another, the combination of the voltage measurements $V_H$, $V_L$ is different so as to define a different position PosB for each beacon BA on the motor vehicle V, and the voltage measurements $V_H$, $V_L$ depend on the variation of the values of the resistors R2', R3', R4'. Thus, from one vehicle connector CoV to another, the combination of the values of the resistors R2', R3', R4' are different.

Thus, it is possible to perform a coding of as many desired positions PosB on the motor vehicle V for the beacons BA.

Initialization Phase PH0

In order to obtain the list of the positions PosB and the beacons BA, during an initialization phase PH0 also called learning phase, the central electronic unit PE is suitable for powering each beacon BA simultaneously.

Upon the powering of the beacons BA:

the main timer $CPT_A$ is triggered in a time-correlated manner with the activation of the power supply Vcc of all the beacons BA, namely as soon as they are powered up. It is incremented in time, namely every 100 ms in the nonlimiting example taken;

the secondary timer $CPT_B$ is also triggered in a time-correlated manner with the power supply of said beacons BA. It is incremented in time at the same time as the main timer $CPT_A$, namely every 100 ms in the nonlimiting example taken. The secondary timer $CPT_B$ and the main timer $CPT_A$ are synchronous events.

When the beacon BA is powered, it performs voltage measurements $V_H$ and $V_L$ and, as a function of the values of these voltage measurements, it recovers its position PosB. To this end, it compares the value of the voltage measurements with the coding table TC that it has in memory.

Then, it broadcasts an advertising frame ADV which comprises its identifier ID, its secondary timer $CPT_B$ and its position PosB on the motor vehicle V, namely the location where it has been mounted on said motor vehicle V.

By receiving the identifier ID and the position PosB of each beacon BA, the central electronic unit PE can establish a list of the beacons and of their respective position PosB, more particularly a list of identifiers ID with their associated respective position PosB.

Moreover, by receiving the secondary timer $CPT_B$ of a beacon BA, the central electronic unit PE is suitable for comparing the values of the two main $CPT_A$ and secondary $CPT_B$ timers which have been triggered at the same time and, as a function of said comparison, knows whether the beacon BA does indeed belong to said motor vehicle V or to another motor vehicle which would be in proximity to said motor vehicle V concerned. If the values of the two main $CPT_A$ and secondary $CPT_B$ timers are equal, then the beacon BA does indeed belong to the motor vehicle V, otherwise it does not belong to the motor vehicle V. In the latter case, the beacon BA concerned is not taken into account. Thus, by virtue of the main $CPT_A$ and secondary $CPT_B$ timers, the pairing of the beacon BA with the motor vehicle V (in particular with said central electronic unit PE) is performed.

Figure 7:
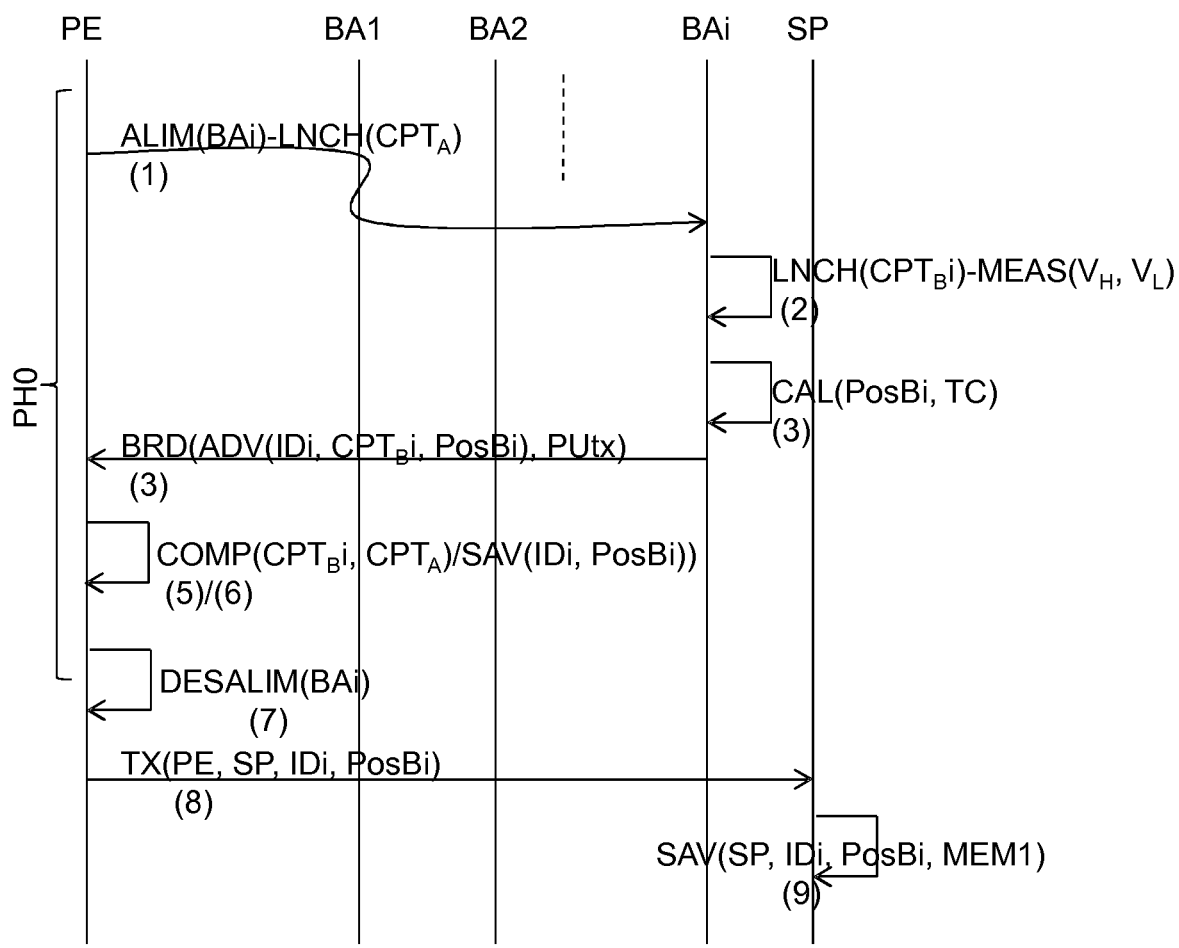
FIG. 7 represents a time diagram illustrating an initialization phase in which said central electronic unit and said plurality of secondary electronic units of the identification device of FIG. 1a or 1b cooperate together, according to a nonlimiting embodiment.

FIG. 7 illustrates the steps of the initialization phase PH0. In the nonlimiting example illustrated, the main timer $CPT_A$ is triggered upon the activation of the power supply Vcc of the beacons BA. The same applies for the secondary timers $CPT_B$.

In the step 1), the central electronic unit PE activates the power supply Vcc of all the beacons BAi (with i=1 to 6) at the same time by virtue of its switching device DC and triggers the main timer $CPT_A$. The switch IT is closed so as to power up said beacons BA1 to BA6.

In the step 2), each beacon BAi triggers its secondary timer $CPT_Bi$ and measures the two voltages $V_H$, $V_L$ internally on its acquisition pins BaH, BaL of its beacon connector CoA.

In the step 3), from the voltage measurements $V_H$, $V_L$ and from the coding table TC, each beacon BAi deduces therefrom its position PosB on the motor vehicle V.

In the step 4), each beacon BAi broadcasts an advertising frame ADVi with its identifier IDi, its secondary timer $CPT_Bi$, and its position PosBi. The central electronic unit PE receives the advertising frames ADVi from each beacon BAi.

In the step 5), the central electronic unit PE correlates the main timer $CPT_A$ and the secondary timer $CPT_Bi$ received from each beacon BAi so as to check whether each beacon BAi does indeed belong to the motor vehicle V.

In the step 6), if the main timer $CPT_A$ and the secondary timer $CPT_Bi$ are equal, the central electronic unit PE saves the identifier IDi in memory with the corresponding position PosBi of the beacon BAi concerned. It will thus have in memory a list MAP of correlation between the identifiers IDi of each beacon BAi and their associated respective position PosBi.

Then, in the step 7), the central electronic unit PE deactivates the power supply Vcc of all the beacons BAi at the same time, so the latter are thus powered down, and the main timer $CPT_A$ is reinitialized together with the secondary timers $CPT_B$.

The initial phase PH0 is thus finished.

When a user terminal SP has been paired with the motor vehicle V, in the step 8), the central electronic unit PE transmits the list MAP of the positions PosB and of the identifiers ID of beacons BA associated with the user terminal SP via a secure communication channel.

In the step 9), the user terminal SP saves said list MAP in memory MEM1.

It will be noted that the initialization phase PH0 is launched without there being any need for a communication with a user terminal SP. It is executed before the sale of the motor vehicle V to an individual or after the sale in the event of a repair in a nonlimiting example.

It will be noted that the steps 8) and 9) do not form part of the initialization phase PH0. Indeed, they are done with the user terminal SP when the motor vehicle V has been sold to an individual in a nonlimiting example.

It will be noted that the initialization phase PH0 can be launched:

automatically when there is no identifier ID of a beacon BA in the memory of the computer CAC or of the central electronic unit PE, either by the central electronic unit PE itself, or by the connectable computer CAC which sends an initialization command to the central electronic unit PE via the LIN/CAN network for it to start the initialization phase PH0;

via a diagnostic command launched by an operator via a standard diagnostic tool on the production line or in after-sales service;

when the battery is repositioned in the motor vehicle V after having been disconnected from said motor vehicle V, etc.

Operating Phase PH1

Figure 8:
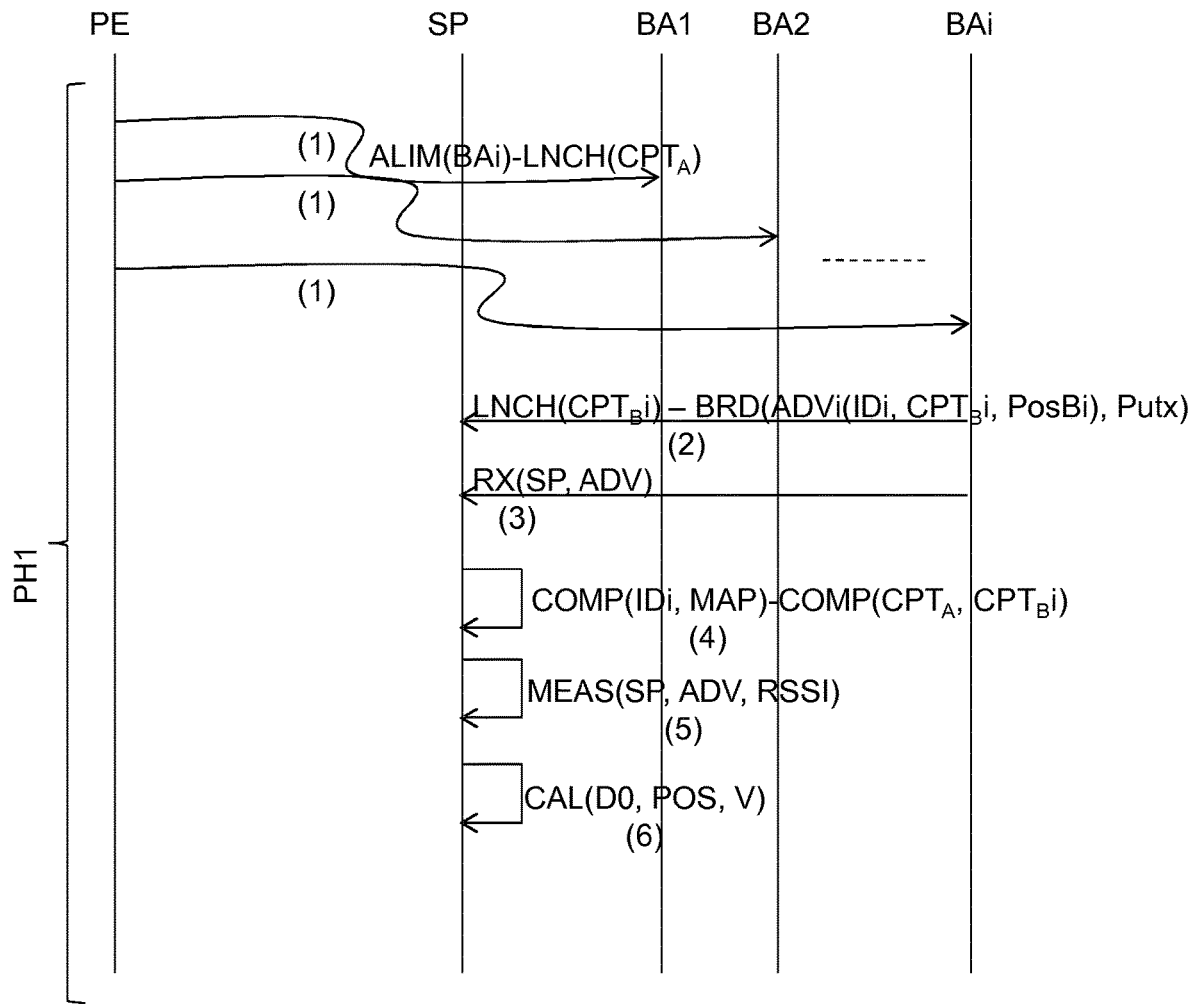
FIG. 8 represents a time diagram illustrating an operating phase in which said central electronic unit and said plurality of secondary electronic units of the identification device of FIG. 1a or 1b cooperate with a user terminal, according to a nonlimiting embodiment.

The operating phase PH1 is illustrated in FIG. 8.

It is performed after the user terminal SP has been paired with the motor vehicle V, namely has been recognized by the motor vehicle V. There is therefore a secure communication channel established between the central electronic unit PE (or the connectable computer CAC) and said user terminal SP.

In the nonlimiting example of FIG. 8, the central electronic unit PE manages the main timer $CPT_A$. In the nonlimiting example illustrated, the main timer $CPT_A$ is triggered upon the activation of the power supply Vcc of the beacons BA. The same applies for the secondary timers $CPT_B$.

During the operating phase PH1, in the step 1), the electronic unit PE is suitable for:
activating the power supply Vcc of all the beacons BA simultaneously; and
triggering its main timer $CPT_A$ in a time-correlated manner with the activation of the power supply Vcc of said beacons BA.

In the step 2), in the nonlimiting example of the six beacons BA1 to BA6, the activation of their power supply Vcc simultaneously causes the six beacons BA1 to BA6 to trigger their respective secondary timer $CPT_B1$ to $CPT_B6$, and all broadcast every 100 ms respectively associated respective advertising frames ADV1 to ADV6, said advertising frames ADV1 to ADV6 respectively comprising the identifiers ID1 to ID6 of the six beacons BA1 to BA6, their associated secondary timer $CPT_B1$ to $CPT_B6$ and the six positions PosB1 to PosB6 of the six beacons BA1 to BA6.

In the step 3), the user terminal SP will thus receive:
via the secure communication channel, the main timer $CPT_A$;
via the advertising frames ADV1 to ADV6, the six identifiers ID1 to ID6, the six secondary timers $CPT_B1$ to $CPT_B6$, and the six positions PosB1 to PosB6.

In the step 4), when the user terminal SP receives an advertising frame ADV from a beacon BA, it will thus:
compare the identifier ID of the beacon BA received with the identifiers originating from the list MAP saved in memory MEM1; and
compare the secondary timer $CPT_B$ of said beacon BA with the main timer $CPT_A$ received.

It does this for each beacon BA from which it receives an advertising frame ADV and as soon as it receives said advertising frame ADV. By comparing the identifier ID of the beacon BA received with the identifiers originating from the list MAP in memory, the user terminal SP recovers the exact position PosB (in said list MAP in memory) of the beacons BA from which it has received the different advertising frames ADV. It will therefore be able to correctly calculate its distance D0 relative to each of the beacons BA installed. In a nonlimiting embodiment, the user terminal SP is suitable for, as a function of the identifier ID received in the advertising frame ADV broadcast by a beacon BA, comparing the position PosB received in said advertising frame ADV and the position PosB of the list MAP in memory. If the two positions PosB are equal, that guarantees that no one has swapped the positions of the beacons BA. If the two positions PosB are different, the initialization phase PH0 can be restarted.

If an identifier ID is missing with respect to all the identifiers ID in memory, that means that there is a problem. In this case, the display screen E of the user terminal SP displays the fact that there is an error and the subsequent steps are not executed, or the calculation of the position POS of the user terminal SP is done in degraded mode, namely without the measurement of the received strength RSSI of the advertising frame ADV from the beacon BA which is missing.

If the identifiers ID received correspond to those of the list MAP saved in memory but if at least one of the secondary timers $CPT_B$ is different from the associated main timer $CPT_A$, that means that there is a beacon BA which is out of synchronization, or that the beacon BA concerned is the subject of a hacking attempt through an attempt to simulate the signal from the true beacon BA belonging to the motor vehicle V (namely simulation of the advertising frame ADV or of the data frame). In this case, the power supply of the beacon BA concerned is cut to resynchronize the timers. If the synchronization is not good, then an error is displayed on the screen E of the user terminal SP and the subsequent steps are not executed.

If an identifier ID is not included in the list MAP saved in memory, that means the beacon BA belongs to another motor vehicle V. It is not taken into account for the calculation of the position POS of the user terminal SP.

If the identifiers ID received correspond to those of the list MAP saved in memory, that means that all the beacons BA have indeed been identified together with their exact position PosB according to the list MAP saved in memory. Furthermore, if all the secondary timers $CPT_B$ are equal to the main timer $CPT_A$, that means that there is no beacon BA that has been hacked. The subsequent steps can be executed.

In the step 5), thus, after identification of the beacons BA and of their position PosB, the user terminal SP performs a measurement of the received strength RSSI of the advertising frames ADV received as mentioned previously. It performs a sorting of these RSSI measurements as a function of the beacon BA which broadcasts the advertising frame ADV, using its identifier ID.

Subsequently, the distance D0 at which said user terminal SP is located from the motor vehicle V can be determined for each beacon BA as a function of the measurements of the received strengths RSSI. Thus, the distance D0 at which the user terminal SP is located from the beacon BA1, the distance D0 at which it is located from the beacon BA2 and the distance D0 at which it is located from the beacon BA3, and so on, are known. This determination is made as a function of a calibration curve which indicates, for a given distance value, the transmitted strength PUtx and the corresponding received strength measurement RSSI. Since such a curve is known to the person skilled in the art, it is not described here.

Finally, in the step 6), the position POS of the user terminal SP relative to the motor vehicle V is determined as a function of the determined distances D0 of each beacon BA. In a nonlimiting embodiment, the position POS is determined according to a location method that is well known to the person skilled in the art. In a nonlimiting embodiment, this determination is made by the user terminal SP or by the central electronic unit PE. In the nonlimiting example illustrated, it is performed by the user terminal SP.

Based on the position POS of the user terminal SP and on the function Fct requested, said function is executed or not executed by the motor vehicle V.

Thus, in nonlimiting examples:

if the user terminal SP is located outside of the motor vehicle V, the start function Fct is authorized (to be able to remove the motor vehicle from a parking space for example) or not;

if the user terminal SP is located inside the motor vehicle V, the function Fct of locking of the external openings is not authorized;

if the user terminal SP is located on the left side of the motor vehicle V, the function Fct of opening of the right side door of the motor vehicle V is not authorized;

if the user terminal SP is located in the trunk lid the start function Fct is authorized;

if the user terminal SP is located at a distance less than 2 meters from the motor vehicle V, as recommended by the Thatcham consortium, then the function Fct of unlocking of the openings is authorized.

It will be noted that, during the operating phase PH1, to avoid the problem of clock offset in time of the different secondary timers $CPT_B$, as soon as a secondary timer $CPT_B$ goes beyond the determined offset Off, the central electronic unit PE:

deactivates the power supply Vcc of all the beacons BA simultaneously. Then, the central electronic unit PE once again reactivates the power supply Vcc of all the beacons BA simultaneously.

resets the main timer $CPT_A$.

Following the deactivation of the power supply Vcc of a beacon BA, the secondary timer $CPT_B$ is reset to its initial value.

Each beacon BA concerned subsequently broadcasts its duly reset secondary timer $CPT_B$. They are thus received by the user terminal SP.

The central electronic unit PE sends, via the secure communication channel, also to the user terminal SP, the reset main timer $CPT_A$. Said secondary timers $CPT_B$ and the main timer $CPT_A$ are once again incremented every 100 ms after the reactivation of the power supply Vcc of the beacon or beacons BA.

If at least one secondary timer $CPT_B$ is not reset correctly relative to its initial value, that means that there is a problem, for example that the beacon BA is hacked. In this case, the calculation of the position POS of the user terminal SP is not performed and the function Fct is not executed.

Obviously, the description of the invention is not limited to the application, to the embodiments and to the examples described above.

Thus, in a nonlimiting embodiment in which the beacons BA are positioned in the tires, they can be used for a TPMS application called "Tire Pressure Monitoring System", which gives information on the pressure of the tire.

Thus, in another nonlimiting embodiment, the function Fct executed is an automatic parking of the motor vehicle V.

Thus, in a nonlimiting embodiment, a single voltage measurement can be performed on an acquisition pin of a beacon BA connector (the latter then comprising only a single acquisition pin) which makes it possible to define two positions PosB of beacons BA. In this case, the vehicle connector CoV comprises only one coding pin BvH and a single resistor R' linked to the pin Bv+ and to a coding pin BvH.

Thus, the invention described offers in particular the following advantages:

it is simple to implement;

it makes it possible to use user terminals SP which have no embedded low frequency (BF) location system such as cellphones for example;

it is a solution which does not involve any human operator and therefore avoids errors in the determination of the position of a beacon;

it allows for a time saving;

it does not require specific hardware. It is therefore a less expensive solution;

it makes it possible to perform the pairing of a beacon BA with a motor vehicle because it makes it possible to determine whether a beacon BA does indeed belong to said motor vehicle V;

it makes it possible to determine that a beacon BA has not been hacked;

it allows a beacon BA to determine for itself its own position on the motor vehicle V, namely the location at which it has been installed on the motor vehicle V;

it makes it possible to indicate the position PosB of the beacons BA to the user terminal SP;

it avoids performing an initialization phase through a wired connection including a wired network (such as an LIN or CAN network) between each beacon BA and the central electronic unit PE which requires the addition of one or more wires which run throughout the vehicle, as well as the components which have to manage this communication on each of the beacons BA.

The invention claimed is:

1. A device for identifying a position of a secondary electronic unit on a motor vehicle, wherein said identification device comprises:

a central electronic unit for managing the power supply of a plurality of secondary electronic units and comprising a switching device for switching the power supply of all the secondary electronic units;

a main timer for being triggered in a time-correlated manner with the activation of the power supply of said secondary electronic units by said switching device;

said plurality of secondary electronic units, each secondary electronic unit:

comprising a secondary timer for being triggered in a time-correlated manner with the power supply of said secondary electronic unit, and being for performing at least one internal voltage measurement when the secondary electronic unit is powered, said at least one voltage measurement being representative of the position of said secondary electronic unit on said motor vehicle.

2. The identification device as claimed in claim 1, wherein a secondary electronic unit is a beacon.

3. The identification device as claimed in claim 1, wherein a secondary electronic unit comprises a connector comprising a power supply pin, a ground pin and at least one acquisition pin from which said at least one voltage measurement is performed.

4. The identification device as claimed in claim 1, wherein a secondary electronic unit is for performing two voltage measurements.

5. The identification device as claimed in claim 1, wherein said connector of said secondary electronic unit is suitable for being connected to a vehicle connector, the latter comprising a power supply pin, a ground pin and at least one coding pin and at least one resistor linked to at least two pins out of said power supply pin, said ground pin and said at least one coding pin and wherein said at least one voltage measurement is a function of a value of said at least one resistor.

6. The identification device as claimed in claim 5, wherein said vehicle connector comprises two coding pins.

7. The identification device as claimed in claim 5, wherein the value of said at least one resistor is defined so as to generate a short-circuit between said at least two pins to which said at least one resistor is linked.

8. The identification device as claimed in claim 1, wherein, when it is powered, a secondary electronic unit is for broadcasting an advertising frame comprising an identifier, its position on the motor vehicle and said secondary timer.

9. The identification device as claimed in the preceding claim 8, wherein said central electronic unit is for:
receiving said advertising frame broadcast by said secondary electronic unit;
correlating said secondary timer with said main timer so as to check that said secondary electronic unit belongs to said motor vehicle;
saving in memory said position with said identifier of said secondary electronic unit received in said advertising frame.

10. The identification device as claimed in claim 9, wherein said central electronic unit is for transmitting to said user terminal said identifier and said position associated with each secondary electronic unit on the motor vehicle.

11. The identification device as claimed in claim 1, wherein said central electronic unit is for:
deactivating the power supply of all the secondary electronic units simultaneously; and
reactivating the power supply of all the secondary electronic units simultaneously.

12. The identification device as claimed in claim 1, wherein said switching device comprises a single switch associated with all the secondary electronic units.

13. The identification device as claimed in claim 1, wherein said central electronic unit is a computer that can be connected to a network of the motor vehicle or is for cooperating with a computer that can be connected to a network of the motor vehicle.

* * * * *